Nov. 17, 1964  W. A. HERPICH  3,157,032
HYDRAULIC FLOW EQUALIZER
Filed Sept. 20, 1962  3 Sheets-Sheet 1

INVENTOR.
WILLIAM A. HERPICH
BY
Owen + Owen
ATTORNEYS

Nov. 17, 1964  W. A. HERPICH  3,157,032
HYDRAULIC FLOW EQUALIZER
Filed Sept. 20, 1962  3 Sheets-Sheet 2
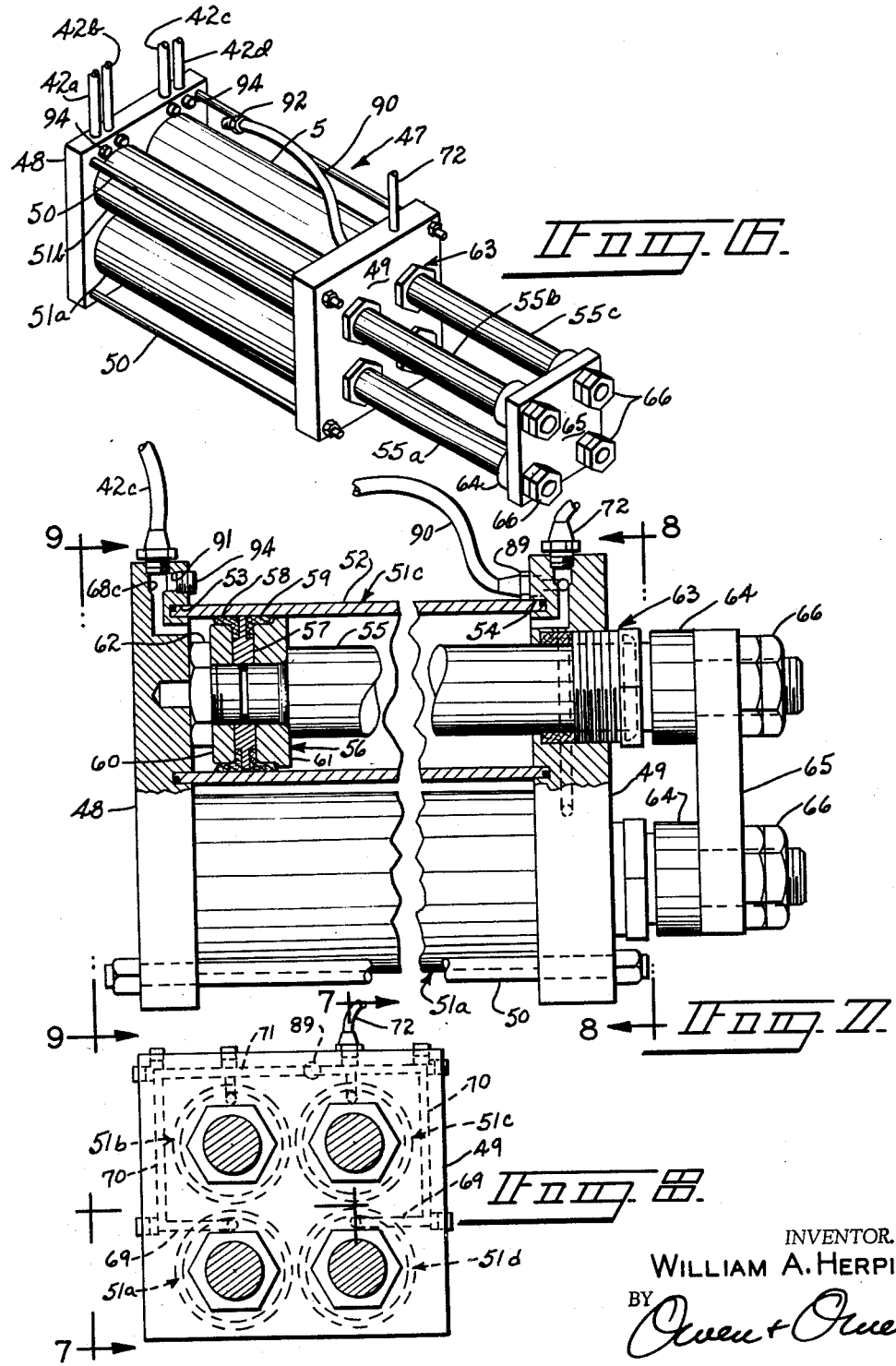
INVENTOR.
WILLIAM A. HERPICH
BY
Owen + Owen
ATTORNEYS

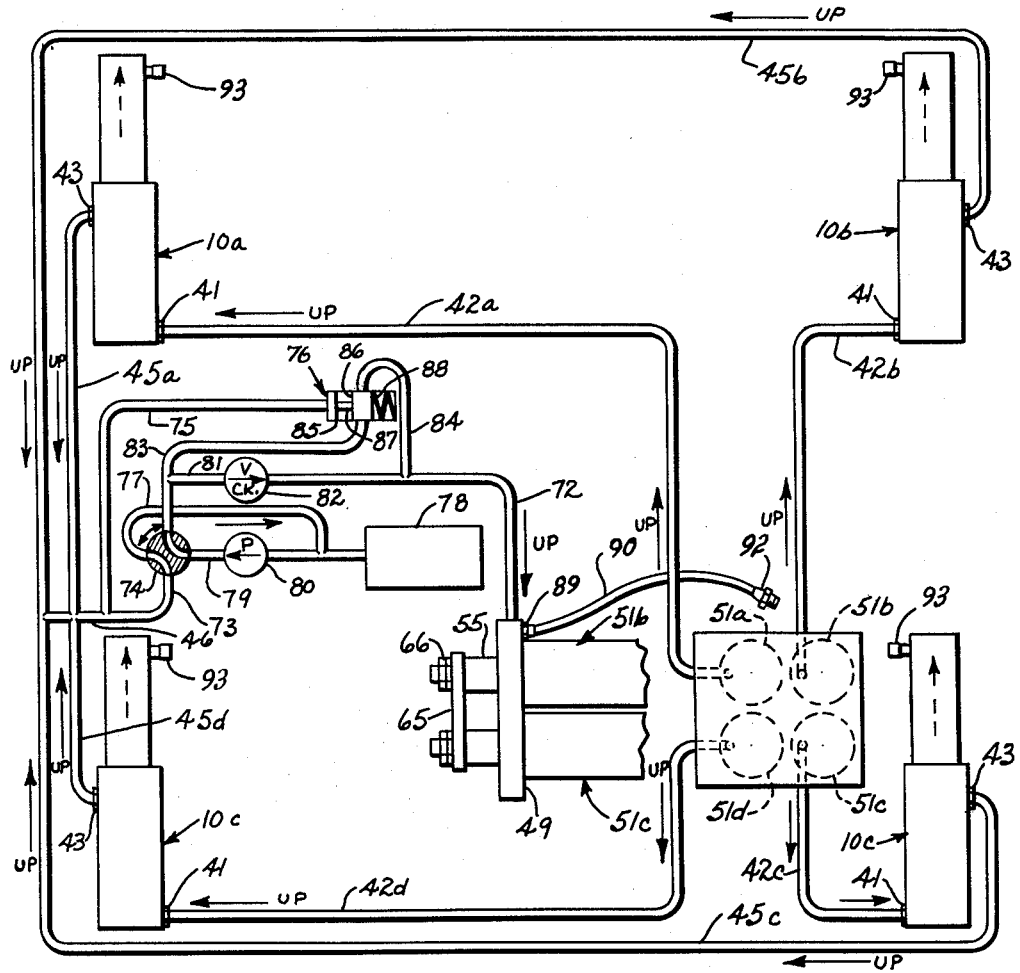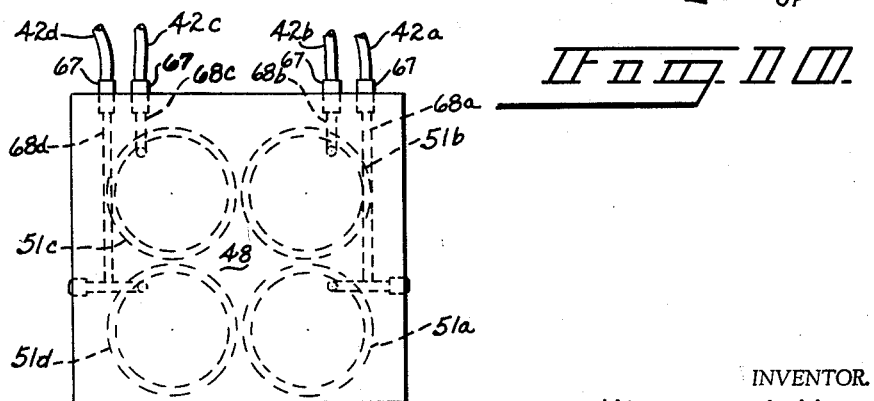

United States Patent Office 3,157,032
Patented Nov. 17, 1964

3,157,032
HYDRAULIC FLOW EQUALIZER
William A. Herpich, Galion, Ohio, assignor to Hercules Galion Products, Inc., Galion, Ohio, a corporation of Delaware
Filed Sept. 20, 1962, Ser. No. 224,912
7 Claims. (Cl. 60—54.5)

This invention relates to a hydraulic flow equalizer for the purpose of equalizing the flow of hydraulic fluid to each of a plurality of simultaneously acting power cylinders in order to insure that each of the cylinders will extend its respective piston rod the same distance as the others regardless of the relative value of the forces acting against each of the hydraulic cylinders. The invention will be illustrated as particularly applied to the extension of four simultaneously acting power cylinders utilized for lifting the four corners of a load carrying truck bed.

The problem of insuring the positive, equal, linear movement of a plurality of simultaneously acting hydraulic cylinders wherein all of the cylinders act against a single object, but wherein the load or force acting each of the cylinders may be different, is considerable. If hydraulic fluid is fed to all of the cylinders from a common power line, the cylinders extend distances inversely proportional to the force to be overcome by each of the cylinders. If separate individual power lines and systems are used for the cylinders, it is difficult to balance the systems relative to each other.

It is therefore the principal object of the instant invention to provide a hydraulic flow equalizer which has a separate cylinder that is hydraulically coupled to each of the several power cylinders and in which all of the cylinders of the equalizer are mechanically coupled to each other so that they move together regardless of the relative value of the forces to be overcome by their respective power cylinders.

It is yet another object of the instant invention to provide a multiple cylinder hydraulic flow equalizer having the same number of cylinders as there are power cylinders and in which all the equalizer cylinders may be connected alternately to a common power fluid line or a common exhaust line and each of the equalizer cylinders is coupled to its respective power cylinder by a captive or closed hydraulic system.

It is a still further object of the instant invention to provide a hydraulic flow equalizer comprising a plurality of parallel hydraulic cylinders which are rigidly mounted together and with all of their pistons mechanically coupled together to insure their simultaneous movement to the same extent; each of the hydraulic flow cylinders being connected by an individual captive oil system to its respective power cylinder.

It is a still further object of the instant invention to provide a hydraulic flow equalizer of the type described which is particularly designed to facilitate the filling of the captive systems with hydraulic fluid and to minimize leakage by pressure balancing.

These and other more specific objects and advantages will be better understood from the following specification which describes the application of a hydraulic flow equalizer embodying invention to a specific function and from the drawings in which:

FIG. 1 is a view in side elevation on a small scale of a motor truck equipped with a "set-off" body and with a permanent vertically movable platform whereby the set-off body may be raised and lowered, the platform being elevated and lowered relative to the truck chassis by a plurality of power cylinders and the hydraulic flow equalizer of the invention being used for equalizing the movement of such power cylinders;

FIG. 6 is a fragmentary view in perspective of a hydraulic flow equalizer embodying the invention;

FIG. 7 is a fragmentary view partly in section and partly in elevation taken longitudinally through the hydraulic flow equalizer shown in FIG. 6 and, in part along the longitudinal vertical center line of one of its cylinders as indicated by the line 7—7 of FIG. 8;

FIG. 8 is a fragmentary view in end elevation taken from the position indicated by the line 8—8 of FIG. 7;

FIG. 9 is a view similar to FIG. 8 but taken from the position indicated by the line 9—9 of FIG. 7 and showing the end of the hydraulic flow equalizer opposite from that illustrated in FIG. 8; and FIG. 10 is a simplified schematic hydraulic flow diagram illustrating the connections and function of a hydraulic flow equalizer embodying the invention.

Figure 4:
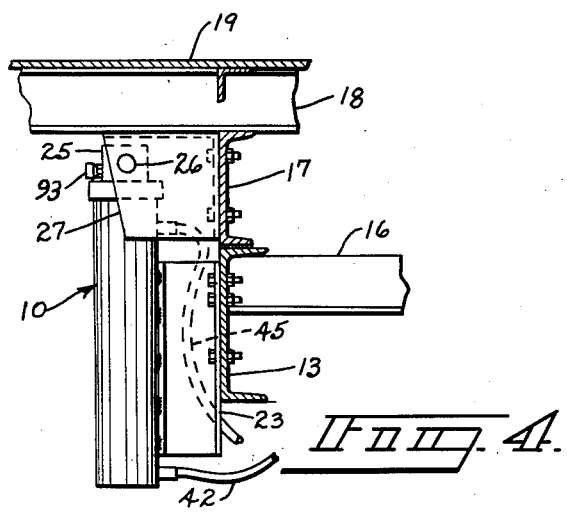
FIG. 4 is a fragmentary, vertical sectional view on a greatly enlarged scale taken along the line 4—4 of FIG. 1 and illustrating the mounting of an individual power cylinder on the chassis and permanent body of the truck illustrated in FIGS. 1–3.

For purposes of illustration throughout this specification, a hydraulic flow equalizer embodying the invention will be described as used for equalizing the flow of fluid to four hydraulic lift or power cylinders 10, indicated also in FIG. 10 by the reference numbers 10a, 10b, 10c, and 10d. The four power cylinders 10 are mounted, two on each side, for lifting a permanent platform or body 11 relative to a truck chassis 12. The chassis 12 consists of two parallel elongated side frames 13 (see also FIG. 4) and has appropriate ground wheels 14 and an engine and cab generally indicated by the reference number 15. The chassis side frames 13 are conventionally connected to each other by suitable cross bracing such as the beam 16 (FIG. 4).

Figure 1:
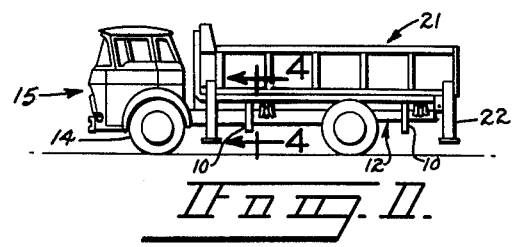
Figure 2:
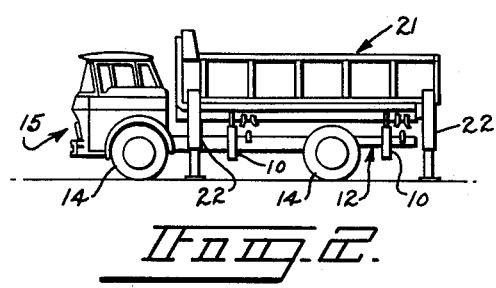
FIG. 2 is a view similar to FIG. 1 showing the truck with its permanent body or platform in elevated position whereby the "set-off" body may be positioned on the ground.
Figure 3:
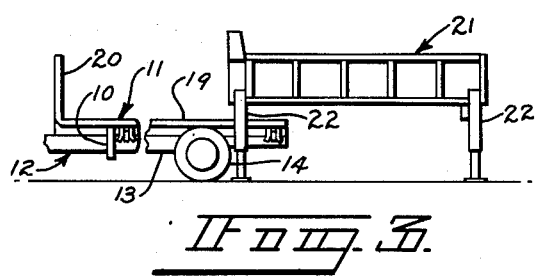
FIG. 3 is a view similar to FIGS. 1 and 2 showing the set-off body supported on the ground and illustrating how the truck may be driven out from beneath the set-off body after its permanent body has been lowered.

The permanent body 11 is fabricated from structural elements including parallel longitudinal channels 17, cross beams 18, and floor 19 and, for example, a front wall 20. In the truck illustrated in the drawings, the permanent body 11 may be used as a flat bed truck or it may be used for the purpose of supporting, elevating and lowering a "set-off" body generally indicated by the reference number 21 which has four extensible support legs 22. Reference to FIGS. 1, 2 and 3 indicates how the truck with its permanent body 11 and set-off body 21 is utilized. For travel on the highway and conventional use, the set-off body 21 rests upon the permanent body 11 in the position of FIG. 1 with its support legs 22 telescoped into road clearing or upper position. When it is desired to set-off the body 21 as, for example, at a location where its contents are to be unloaded or where material is to be loaded into it without also requiring that the truck cab and engine 15 and chassis 12 be immobilized during this loading or unloading, the operator drives to the location where the body is to be positioned and actuates suitable mechanism to extend the pistons of the hydraulic cylinders 10 lifting the permanent body 11 and the set-off body 21 into the position illustrated in FIG. 2. At this point, the legs 22 are extended into ground engagement and locked so that they can support the body 21. The operator then reverses the hydraulic flow to the cylinders 10, lowering the permanent body 11 out of contact with the set-off body 21, and then drives out from between the front support legs 22 of the set-off body 21, proceeding to another location to pick up another set-off body or to utilize the permanent body 11 of the truck for other purposes. After the set-off body 21 is loaded or unloaded, as the case might be, the truck driver may return backing the truck into the space beneath the set-off body 21, elevating the permanent body 11, to raise the set-off body 21, telescoping the legs 22 and again lowering the permanent body 11 to the position indicated in FIG. 1.

It will be appreciated that a load in a truck body is very unlikely to be evenly distributed over its entire surface or throughout its entire extent. For example, a very heavy object such as a machine might be located at one corner of the body 21 with much lighter objects at other corners or, if the body 21 is a bulk body, the quantity of the bulk material might be much deeper at one or more corners of the body. Thus, the load to be overcome by the lifting cylinders 10 is very unlikely to be uniform at each of the four corners of the body or at each of the two ends of the body. However, in order to lift the set-off body 21 to proper position for extending all of its legs for positioning it on the ground, it is necessary that the permanent body 11 be elevated uniformly and maintained horizontal. It is for this purpose that the hydraulic flow equalizer of the invention is employed.

Figure 5:
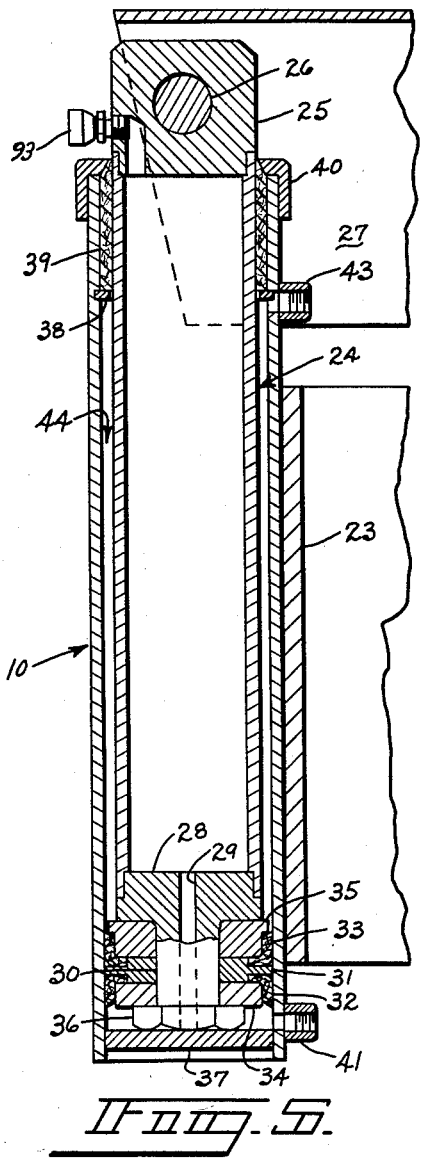
FIG. 5 is a still further enlarged vertical sectional view of a power cylinder.

Each of the power cylinders 10 is rigidly mounted on one of the chassis side frames 13 by a vertically extending I-channel 23 (FIG. 4) which is bolted to the chassis side frames 13 and, for example, welded to its respective power cylinder 10. Each of the power cylinders 10 has a piston, generally indicated by the reference number 24 in FIG. 5, which has an end plug 25. Each of the end plugs 25 is bored for the reception of a pintle 26 extending horizontally between and secured in a pair of horizontally spaced, vertical gusset plates 27 which are welded or otherwise rigidly secured to the outer side of the body channel 17 and the body cross beams 18.

Each of the pistons 24 is hollow and is closed at its upper end by the end plug 25. At the lower end of each of the pistons 24 there is a lower end plug 28 having a central bore 29 therethrough and a threaded stem 30. The stem 30 receives a flanged spacer 31, a pair of oppositely directed wiping seals 32 and 33, and collars 34 and 35 for the seals 32 and 33, respectively, all of which are retained on the stem 30 by a heavy locking nut 36. The lower end of the cylinder 10 is closed by a fixed end plate 37.

Near the upper end of the cylinder 10 there is located an annular ring 38 which positions a tubular oil seal 39 and the upper end of the cylinder 10 is closed by a collar 40 which also retains the oil seal 39 in place. At the bottom end of each of the cylinders 10 there is a threaded nipple 41 which couples the particular cylinder 10 to its respective one of a plurality of captive oil connecting lines 42a (FIG. 10), 42b, 42c, and 42d for the respective power cylinders 10a, 10b, 10c, and 10d. Thus the captive oil lines 42a, b, c, and d are connected to their respective cylinders 10 and to the interiors of the hollow pistons 24 of the cylinders 10 through the bores 29 and the end plugs 28 thereof.

Near the upper end of each of the cylinders 10 at a level just below the annular rings 38 and oil seals 39, there is located a nipple 43 by which an annular space 44 external of the piston 24 in each of the cylinders 10 is connected (FIG. 10) to one of an equal number of power lines 45a, 45b, 45c, and 45d. All of the lines 45a, b, c, and d are commonly connected to a manifold 46.

Referring now to FIGS. 6–9, a hydraulic flow equalizer according to the invention is generally indicated by the reference number 47. The equalizer 47 comprises a pair of heavy duct plates 48 and 49 which are rigidly assembled in spaced, parallel relationship by several tie rods 50. In the embodiment of the invention illustrated in the drawings, there are four power cylinders 10a, 10b, 10c, and 10d, and, therefore, the hydraulic flow equalizer 47 has four equalizer cylinders 51a, 51b, 51c, and 51d corresponding respectively, to the four power cylinders. Each of the four equalizer cylinders 51a, b, c, or d comprises an outer tube 52, the open ends of which are set into annular recesses 53 and 54, respectively, in the duct plates 48 and 49. The ends of the tubes 52 are machined square so that when the tubes 52 are in place between the duct plates 48 and 49 and the tie rods 50 are tightened, the axes of the four cylinders 51a, b, c, and d are parallel to each other and perpendicular to the duct plates 48 and 49.

Each of the cylinders 51a, b, c, and d also include a piston comprising a piston rod 55 (FIG. 7) and a piston body generally indicated by the reference number 56. The piston body 56 consists of a flanged spacing ring 57, a pair of wipers 58 and 59, retaining collars 60 and 61 and a heavy locking nut 62 threaded on the end of the piston rod 55. The outboard end of each of the piston rods 55 extends through a packing gland generally indicated by the reference number 63 set into a suitable bore in the duct plate 49. At their outer ends, each of the piston rods 55a, b, c, and d extends through a positioning collar 64 and the collars 64 are welded to a heavy equalizing plate 65. The ends of the piston rods 55 are tenoned and threaded, extending through suitable holes in the plate 65, and heavy locking nuts 66 are threaded thereon to position the equalizing plate 65 against the shoulders of the rods 55. By this connection through the equalizing plate 65 all of the piston rods 55a, b, c, and d must move together whether being extended outwardly from or inwardly into their respective equalizer cylinders 51a, b, c, and d.

Each of the individual power cylinders 10a, b, c, or d is coupled by its respective captive line 42a, b, c, or d to its respective equalizer cylinder 51a, b, c, or d. The several captive oil lines 42a, b, c, and d are coupled by connectors 67 (FIG. 9) to the ends of passageways 68a, b, c, and d in the duct plate 48 leading to the closed ends of the respective equalizer cylinders 51a, b, c, d. The space in the interior of the piston rod 24 of the cylinder 10, its bore 29, the lower end of the cylinder 10, the captive oil line 42, and the closed end of the equalizer cylinder 51, constitutes a captive oil chamber and is not connected to any external source. Therefore, as fluid is displaced from each of the equalizer cylinders 51, it must flow through the respective captive oil line 42 and into the respective cylinder 10 beneath its piston 24 to thrust the respective piston 24 out of the cylinder 10. Conversely, when the permanent truck body 11 is being lowered, captive oil displaced from the particular cylinder 10 must flow through the captive oil line 42 and into the closed end of the connected one of the equalizer cylinders 51 to extend its piston 55 out of the cylinder 51 and to simultaneously extend the piston rods 55 of the other equalizer cylinders 51 outwardly because of the permanent rigid connection between the piston rods 55 made by the equalizer plate 65.

The piston rod ends of all of the equalizer cylinders 51a, b, c, and d are connected by communicating passageways 69 (FIG. 8), 70 and 71 in the duct plate 49 to a common oil line 72 (see also FIG. 7)

The power oil line manifold 46 is connected by an oil line 73 (FIG. 10) to a valve 74 and by a pilot line 75, to a pressure actuated by-pass valve 76. The valve 74 has two passages which are alternately connectible to place selected pairs of several lines in communication with each other. For example, in the position shown in FIG. 10 which is the position of the mechanism during the upward movement of the pistons of the power cylinders 10, the line 73 from the common power oil manifold 46 is connected to a return oil line 77 leading to an oil supply tank 78. A power source line 79 from a pump 80 is also connected by the valve 74 to a line 81 which leads through a check valve 82 to the line 72. Thus, in the position of FIG. 10, power oil from the supply tank 78 is pumped by the pump 80 through the source line 79, the valve 74, the line 81 through the check valve 82 and then to the common oil line 72 from which it is fed through the passageways in the duct plate 49 into the piston rod end of all of the equalizer cylinders 51a, b, c, d to retract the piston rods 55 of the equalizer cylinders 51a, b, c, and d, and to force the captive oil into the individual power cylinders 10. Return oil from the power cylinder 10 flows through the lines 45a, b, c, and d to the manifold 46 and through the line 73, valve 74 and line 77 to the reservoir 78.

The pressure actuated valve 76 is connected by bypass lines 83 and 84 between the lines 72 and 81, around the check valve 82. The valve 76 has a piston 85 and spool 86 connected by a stem 87 which work against a return spring 88. When the pump 80 is connected to the line 81, as in FIG. 10, the oil in the manifold 46 is return oil from the cylinders 10 at a pressure too low to displace the valve 76 so it remains closed so no oil flows through the by-pass lines 83 and 84.

When it is desired to lower the power cylinders 10, the valve 74 is swung to its alternate position, connecting the source line 79 to the line 73 and the common power manifold 46 and connecting the line 77 to the by-pass line 83. Oil is pumped by the pump 80 through the lines 79 and 73 to the manifold 46 and then through the power lines 45a, b, c, d to the upper ends of the individual cylinders 10a, b, c, d. This forces the piston rods 24 downwardly exhausting the captive oil from beneath the pistons of the cylinders 10 and forcing it into the closed ends of the equalizer cylinders 51a, b, c, d extending the piston rods 55 thereof to their extremity. Pump pressure in the manifold 46 acts through the pilot line 75 to shift the valve 76 to its open position connecting the by-pass lines 83 and 84. Oil displaced from the piston rod ends of the equalizer cylinders 51 flows through the common line 72 to the by-pass line 84, through the valve 76 and by-pass line 83 to the valve 74 and thence through the return line 77 to the oil supply tank 78.

The displacement of each of the cylinders 10 and its corresponding equalizer cylinder 51 is equal so that the captive oil is simply shifted through the captive oil lines 42 from one of the cylinders to the other whenever power is applied either to the power cylinders 10 for retracting their pistons 24 or to the common line 72 of the equalizer cylinders 51 for retracting their piston rods 55.

When the hydraulic system of FIG. 10 is first assembled it is necessary to fill the captive oil systems completely so as to exclude all air therefrom and to insure that the quantity of captive oil in the four separate systems is the same. For this purpose, the duct plate 49 has a filling hose nipple 89 (FIGS. 7 and 8) to which is coupled a flexible filling hose 90. Each of the individual captive oil systems has a filling nipple 91 leading to its respective passageway 68a, b, c or d in the plate 48 and to which a coupling 92 (FIG. 10) on the end of the hose 90 may be connected. Each of the power cylinders 10 has a bleeder valve 93 in its end plug 25 which communicates with the interior of its hollow piston rod 24.

In order to fill each of the captive oil systems the following procedure is carried out. The bleeder valve 93 is opened, for example on the cylinder 10a, and the filling hose 90 is coupled to the filling nipple 91a which connects to the passageway 68a in the duct block 48. The valve 74 is set in the position indicated in FIG. 10 and the pump 80 pumps oil from the supply tank 78 through the lines 79 and 81, the check valve 82 and the common line 72 to the duct plate 49. Oil flows through the filling hose 90 and, through the filling nipple 91a into the passageway 68a and into the closed end of the equalizer cylinder 51a. Oil then flows through the captive oil line 42a and into the base of the cylinder 10a, filling all of the passageways and the interior of the hollow piston 24a. Operation of the pump 80 is continued until all of the air in the particular captive oil system has been driven out and until the first oil without air bubbles flows from the bleeder valve 93 of the cylinder 10a. The bleeder valve 93 is then closed and continued operation of the pump 80 causes the power oil to flow into the piston rod end of the equalizer cylinder 51a retracting its piston rod 55 and fully extending the power cylinder 10a. The filling hose 90 is then disconnected and the nipple 91 closed by a plug 94. The process is repeated with respect to each of the power cylinders 10b, c, d until all of the captive oil systems are filled.

After the captive oil systems are filled in this fashion, the valve 74 is shifted to its alternate position to retract the pistons of the power cylinders 10a, b, c, d and the pump 80 is operated to cause oil to flow through the lines 79 and 73, the manifold 46, and the power oil lines 45a, b, c, d to the upper ends of the power cylinders 10a, b, c, d. When the pistons 24 of the power cylinders are completely retracted, the piston rods 55 of the equalizer cylinders 51a, b, c, d should be fully extended. If the power cylinder pistons 24 do not fully retract, the respective bleeder valve 93 may be slightly opened and the piston 24 fully retracted by bleeding off the excess oil.

Having described my invention, I claim

1. A hydraulic apparatus comprising a plurality of hydraulic power cylinders to be simultaneously actuated, a source of hydraulic fluid under pressure, a fluid return to supply, an equalizer comprising a plurality of equalizer cylinders equal in number to and associated in pairs with said power cylinders, each of said power cylinders and each of said equalizer cylinders having a closed end, a piston and piston rod therein, one end of said piston rod extending out of the end opposite the closed end of the respective cylinder, a gland effecting a seal between each piston rod and the cylinder from which it projects, a captive oil line for each associated pair of power and equalizer cylinders, said captive oil line being connected to and in communication with the closed ends of said power and equalizer cylinders for forming an individual captive system, a common oil line leading to the piston rod end of all of said equalizer cylinders, a manifold, oil lines leading from said manifold to the piston rod ends of all of said power cylinders, means restraining said equalizer cylinders against movement relative to each other, means restraining said equalizer cylinder piston rods against movement relative to each other, valve means for alternately connecting said common line and said manifold to said source and to said return, and means for removing fluid out of said captive systems.

2. A hydraulic apparatus according to claim 1 in which said power cylinders and their piston rods extend parallel to each other and are connected between a single stationary object and a single object to be translated linearly relative to said stationary object.

3. A hydraulic apparatus according to claim 1 in which said equalizer cylinders are mounted parallel to each other by said means for restraining said power cylinders against movement relative to each other.

4. A hydraulic apparatus according to claim 1 in which each of said power cylinder piston rods is hollow and communicates through the respective piston with the closed end of the power cylinder, and a bleeder valve at the end of said hollow piston rod remote from said piston and communicating with the interior of said piston rod.

5. In a vehicle having a generally horizontal chassis and a platform which is supported from and above said chassis: a predetermined number of spaced apart driven hydraulic cylinders secured to said chassis, said cylinders having vertically extending cylinder chambers with open upper ends, a piston in each of said cylinder chambers having means effecting a seal with the walls of the chamber in which it is situated, each piston having a piston rod which projects out of the upper end of the cylinder chamber in which it is positioned for raising said platform, actuating hydraulic cylinders secured together and having parallel cylinder chambers corresponding in number to said driven hydraulic cylinders, individual pistons in respective actuating cylinder chambers effecting a seal with the actuating cylinder chamber in which each is positioned, individual piston rods secured to respective pistons and projecting out of respective actuating cylinder chambers, means locking said piston rods together for simultaneous movement, gland means effecting a sliding seal between individual piston rods and respective actuating hydraulic cylinders, means for supplying high pressure fluid to the piston rod end of each actuating hydraulic cylinder, individual conduit systems each of which connects the end of a respective actuating cylinder chamber opposite the piston rod end thereof to the end of a respective driven cylinder chamber opposite the piston rod end thereof, and means for periodically removing fluid from said conduit systems, whereby the highest fluid pressure used in the system is communicated to the piston rod ends of said actuating cylinders and leakage past the pistons of said actuating cylinders is compensated for by bleeding fluid out of said conduit systems to keep the platform level.

6. In a truck having a generally horizontal chassis and a generally rectangular platform which is supported from and above said chassis: four spaced apart driven hydraulic cylinders rigidly secured to said chassis, said cylinders having vertically extending cylinder chambers with open upper ends, a piston in each of said cylinder chambers having means effecting a seal with the walls of the chamber in which it is situated, each piston having a piston rod which projects out of the upper end of the cylinder chamber in which it is positioned for raising said platform, means at the upper end of each cylinder for effecting a guide between the piston rod of each cylinder and the sidewalls of the cylinder chamber for restraining lateral movement of said platform, four actuating hydraulic cylinders secured together and having four parallel cylinder chambers, individual pistons in respective actuating cylinder chambers effecting a seal with the actuating cylinder chamber in which each is positioned, individual piston rods secured to respective pistons and projecting out of respective actuating cylinder chambers, means locking said piston rods together for simultaneous movement, gland means effecting a sliding seal between individual piston rods and respective actuating hydraulic cylinders, means for supplying high pressure fluid to the piston rod end of each actuating hydraulic cylinder, individual conduit systems each of which connects the end of a respective actuating cylinder chamber opposite the piston rod end thereof to the end of a respective driven cylinder chamber opposite the piston rod end thereof, and means for periodically removing fluid from said conduit systems whereby the highest fluid pressure used in the system is communicated to the piston rod ends of said actuating cylinders and leakage past the pistons of said actuating cylinders is compensated for by bleeding fluid out of said systems to keep the platform level.

7. In a truck having a generally horizontal chassis and a generally rectangular platform which is supported from and above said chassis: four spaced apart driven hydraulic cylinders rigidly secured to said chassis, said cylinders having vertically extending cylinder chambers with open upper ends, a piston in each of said cylinder chambers having means effecting a seal with the walls of the chamber in which it is situated, each piston having a piston rod which projects out of the upper end of the cylinder chamber in which it is positioned for raising said platform, each rod having a passageway communicating the lower surface of the piston with an external surface of the piston rod connected thereto which is at all times above the upper end of the respective cylinder, valve means positioned above the upper end of each cylinder for opening and closing the passageway through each piston rod, means at the upper end of each cylinder for effecting a guiding sliding seal between the piston rod of each cylinder and the sidewalls of the cylinder chamber, four actuating hydraulic cylinders secured together and having four parallel cylinder chambers, individual pistons in respective actuating cylinder chambers effecting a seal with the actuating cylinder chamber in which each is positioned, individual piston rods secured to respective pistons and projecting out of respective actuating cylinder chambers, means locking said piston rods together for simultaneous movement, gland means effecting a sliding seal between individual piston rods and respective actuating hydraulic cylinders, individual conduits each of which connects the end of a respective actuating cylinder chamber opposite the piston rod end thereof to the end of a respective driven cylinder chamber opposite the piston rod end thereof, a source of hydraulic fluid under pressure, a fluid return to said source, and means for alternately communicating said source of hydraulic fluid to the piston rod ends of said actuating cylinder while communicating the piston rod ends of said driven cylinder to said fluid return, and for communicating said source of hydraulic fluid to the piston rod ends of said driven cylinders while communicating the piston rod ends of said actuating cylinders to said return whereby the highest fluid pressure used in the system is communicated to the piston rod ends of said actuating cylinders and leakage past the pistons of said actuating cylinders is compensated for by bleeding fluid out of said valve means to keep the platform level.

References Cited in the file of this patent

UNITED STATES PATENTS

| 718,365 | Martin | Jan. 13, 1903 |
| 1,744,885 | Groene et al. | Jan. 28, 1930 |
| 1,831,238 | Ferris | Nov. 10, 1931 |
| 2,403,325 | Armington | July 2, 1946 |
| 2,499,563 | Bill | Mar. 7, 1950 |
| 2,765,624 | Hoeschle et al. | Oct. 9, 1956 |

FOREIGN PATENTS

| 329,680 | France | Feb. 24, 1903 |